United States Patent
Izawa et al.

(10) Patent No.: US 10,932,635 B2
(45) Date of Patent: Mar. 2, 2021

(54) VACUUM CLEANER

(71) Applicant: TOSHIBA LIFESTYLE PRODUCTS & SERVICES CORPORATION, Kawasaki (JP)

(72) Inventors: Hirokazu Izawa, Aisai (JP); Yuuki Marutani, Nagakute (JP); Kota Watanabe, Seto (JP); Kazuhiro Furuta, Seto (JP)

(73) Assignee: TOSHIBA LIFESTYLE PRODUCTS & SERVICES CORPORATION, Kawasaki (JP)

( * ) Notice: Subject to any disclaimer, the term of this patent is extended or adjusted under 35 U.S.C. 154(b) by 334 days.

(21) Appl. No.: 15/768,360

(22) PCT Filed: Oct. 12, 2016

(86) PCT No.: PCT/JP2016/080249
§ 371 (c)(1),
(2) Date: Apr. 13, 2018

(87) PCT Pub. No.: WO2017/065171
PCT Pub. Date: Apr. 20, 2017

(65) Prior Publication Data
US 2018/0296049 A1     Oct. 18, 2018

(30) Foreign Application Priority Data

Oct. 14, 2015 (JP) .............................. JP2015-202910

(51) Int. Cl.
*G01C 3/08* (2006.01)
*A47L 9/28* (2006.01)
(Continued)

(52) U.S. Cl.
CPC ................ *A47L 9/28* (2013.01); *A47L 9/0411* (2013.01); *A47L 9/0472* (2013.01); *G01C 3/06* (2013.01);
(Continued)

(58) Field of Classification Search
CPC ........ A47L 9/28; A47L 9/0411; A47L 9/0472; A47L 2201/04; A47L 2201/06;
(Continued)

(56) References Cited

U.S. PATENT DOCUMENTS 7,346,191 B2   3/2008  Sano
8,041,079 B2  10/2011  Chiu et al.
(Continued)

FOREIGN PATENT DOCUMENTS

CN     1823672 A    8/2006
CN   101458083 A    6/2009
(Continued)

OTHER PUBLICATIONS

International Search Report dated Nov. 15, 2016 in PCT/JP2016/080249, 2 pages.

*Primary Examiner* — Samantha K Abraham
(74) *Attorney, Agent, or Firm* — Oblon, McClelland, Maier & Neustadt, L.L.P.

(57) ABSTRACT

A vacuum cleaner having improved obstacle detection precision. The vacuum cleaner includes a main casing, driving wheels, control unit, cameras, an image generation part, and a discrimination part. The driving wheels enable the main casing to travel. The control unit controls drive of the driving wheels to make the main casing autonomously travel. The cameras are disposed apart from each other in the main casing to pick up images on a traveling-direction side of the main casing. The image generation part generates a distance image of an object positioned on the traveling-direction side (Continued)

based on the images picked up by the cameras. The discrimination part discriminates whether or not the picked-up object is an obstacle based on the distance image generated by the image generation part.

16 Claims, 10 Drawing Sheets

(51) Int. Cl.
  G01C 3/06      (2006.01)
  G05D 1/02      (2020.01)
  G06K 9/00      (2006.01)
  A47L 9/04      (2006.01)
(52) U.S. Cl.
  CPC ......... *G05D 1/0246* (2013.01); *G05D 1/0251* (2013.01); *G06K 9/00671* (2013.01); *A47L 2201/04* (2013.01); *A47L 2201/06* (2013.01); *G05D 2201/0215* (2013.01)
(58) Field of Classification Search
  CPC ............... G05D 1/0251; G05D 1/0246; G05D 2201/0215; G05D 1/0214; G06K 9/00671; G01C 3/06
  See application file for complete search history.

(56) References Cited

U.S. PATENT DOCUMENTS

| | | | |
|---|---|---|---|
| 8,395,659 | B2 | 3/2013 | Nishigaki |
| 8,934,669 | B2 | 1/2015 | Yang et al. |
| 9,149,167 | B2 | 10/2015 | Hong et al. |
| 9,304,194 | B2 | 4/2016 | Rhee et al. |
| 9,411,338 | B2 | 8/2016 | Hanaoka et al. |
| 9,796,088 | B2 | 10/2017 | Hong et al. |
| 9,841,271 | B2 | 12/2017 | Nakazato et al. |
| 2001/0018640 | A1 | 8/2001 | Matsunaga |
| 2004/0013295 | A1 | 1/2004 | Sabe et al. |
| 2006/0100742 | A1 | 5/2006 | Park |
| 2006/0190135 | A1 | 8/2006 | Lee et al. |
| 2008/0201014 | A1 | 8/2008 | Sonoura |
| 2008/0285799 | A1 | 11/2008 | Chiu et al. |
| 2009/0281661 | A1* | 11/2009 | Dooley ............. B60L 50/52 700/258 |
| 2011/0202175 | A1* | 8/2011 | Romanov ............ B25J 5/00 700/250 |
| 2012/0236119 | A1 | 9/2012 | Rhee et al. |
| 2012/0268567 | A1 | 10/2012 | Nakazato et al. |
| 2013/0000675 | A1 | 1/2013 | Hong et al. |
| 2013/0329945 | A1 | 12/2013 | Yang et al. |
| 2014/0043444 | A1 | 2/2014 | Haraguchi et al. |
| 2015/0362921 | A1 | 12/2015 | Hanaoka et al. |
| 2015/0367512 | A1 | 12/2015 | Hong et al. |
| 2017/0360266 | A1 | 12/2017 | Izawa et al. |
| 2018/0066934 | A1 | 3/2018 | Nakazato et al. |

FOREIGN PATENT DOCUMENTS

| | | |
|---|---|---|
| CN | 102314176 A | 1/2012 |
| CN | 102763132 A | 10/2012 |
| CN | 102846273 A | 1/2013 |
| CN | 103582802 A | 2/2014 |
| JP | 10-31742 A | 2/1998 |
| JP | 11-39596 A | 2/1999 |
| JP | 2006-260098 A | 9/2006 |
| JP | 2007-163223 A | 6/2007 |
| JP | 4763353 B2 | 8/2011 |
| JP | 2012-151851 A | 8/2012 |
| JP | 2012-247364 A | 12/2012 |
| JP | 2013-235351 A | 11/2013 |
| JP | 2013-250694 A | 12/2013 |
| JP | 2014-53018 A | 3/2014 |
| JP | 2014-85940 A | 5/2014 |
| JP | 2014-89548 A | 5/2014 |
| JP | 2014-194729 A | 10/2014 |
| JP | 2016-120168 A | 7/2016 |
| TW | I327536 B | 7/2010 |
| TW | I464689 B | 12/2014 |
| WO | WO 2012/165491 A1 | 12/2012 |
| WO | WO 2014/064990 A1 | 5/2014 |

\* cited by examiner

VACUUM CLEANER

CROSS REFERENCE TO RELATED APPLICATIONS

The present application is a National Stage Application of PCT/JP2016/080249 filed on Oct. 12, 2016. The PCT application acclaims priority to Japanese Patent Application No. 2015-202910 filed on Oct. 14, 2015. All of the above applications are herein incorporated by reference.

FIELD

Embodiments described herein relate generally to a vacuum cleaner including a plurality of image pickup means for picking up images on a traveling-direction side of a main casing.

BACKGROUND

Conventionally, there has been known a so-called autonomous-traveling type vacuum cleaner (cleaning robot) which cleans a floor surface as a cleaning-object surface while autonomously traveling on the floor surface.

Such a vacuum cleaner is required to avoid obstacles during its traveling. For this reason, the vacuum cleaner uses sensors, such as ultrasonic sensors and infrared sensors, for detection of obstacles that obstruct traveling. However, for example, with the use of an ultrasonic sensor, presence of a soft curtain, thin cords, or the like in a traveling direction hinders ultrasonic waves from being properly reflected, making it difficult to detect these objects as obstacles. Also, with the use of an infrared sensor as an example, when a black object, a thin cord, or the like is present as a detection object, it is impossible for the vacuum cleaner to properly receive infrared rays reflected therefrom, hence making it difficult to detect obstacles.

That is, with such an autonomous-traveling type vacuum cleaner, while improving obstacle detection precision makes it possible to improve cleaning performance with stable traveling, failure to detect an obstacle would lead to collision with or stranding on the obstacle or the like, causing a travel stop or the like with cleaning stagnated as a result.

Therefore, for autonomous-traveling type vacuum cleaners, detection of obstacles is important in order to fulfill a smoother cleaning, and improvement of obstacle detection precision is desired.

CITATION LIST

Patent Literature

PTL 1: Japanese Laid-open Patent Publication No. 2007-163223
PTL 2: Japanese Laid-open Patent Publication No. 2013-235351

Technical Problem

An object of the invention is to provide a vacuum cleaner having improved obstacle detection precision.

Solution to Problem

The vacuum cleaner in one aspect of an embodiment has a main casing, driving wheels, a control unit, cameras, a distance image generation part, and a discrimination part. The driving wheels enable the main casing to travel. The control unit controls drive of the driving wheels to make the main casing autonomously travel. The cameras are disposed in the main casing so as to be apart from each other for picking up images on a traveling-direction side of the main casing. The distance image generation part generates a distance image of an object positioned on this traveling-direction side based on the images picked up by the cameras. The discrimination part discriminates whether or not the picked-up object is an obstacle based on the distance image generated by the distance image generation part.

DESCRIPTION OF EMBODIMENTS

Figure 1:
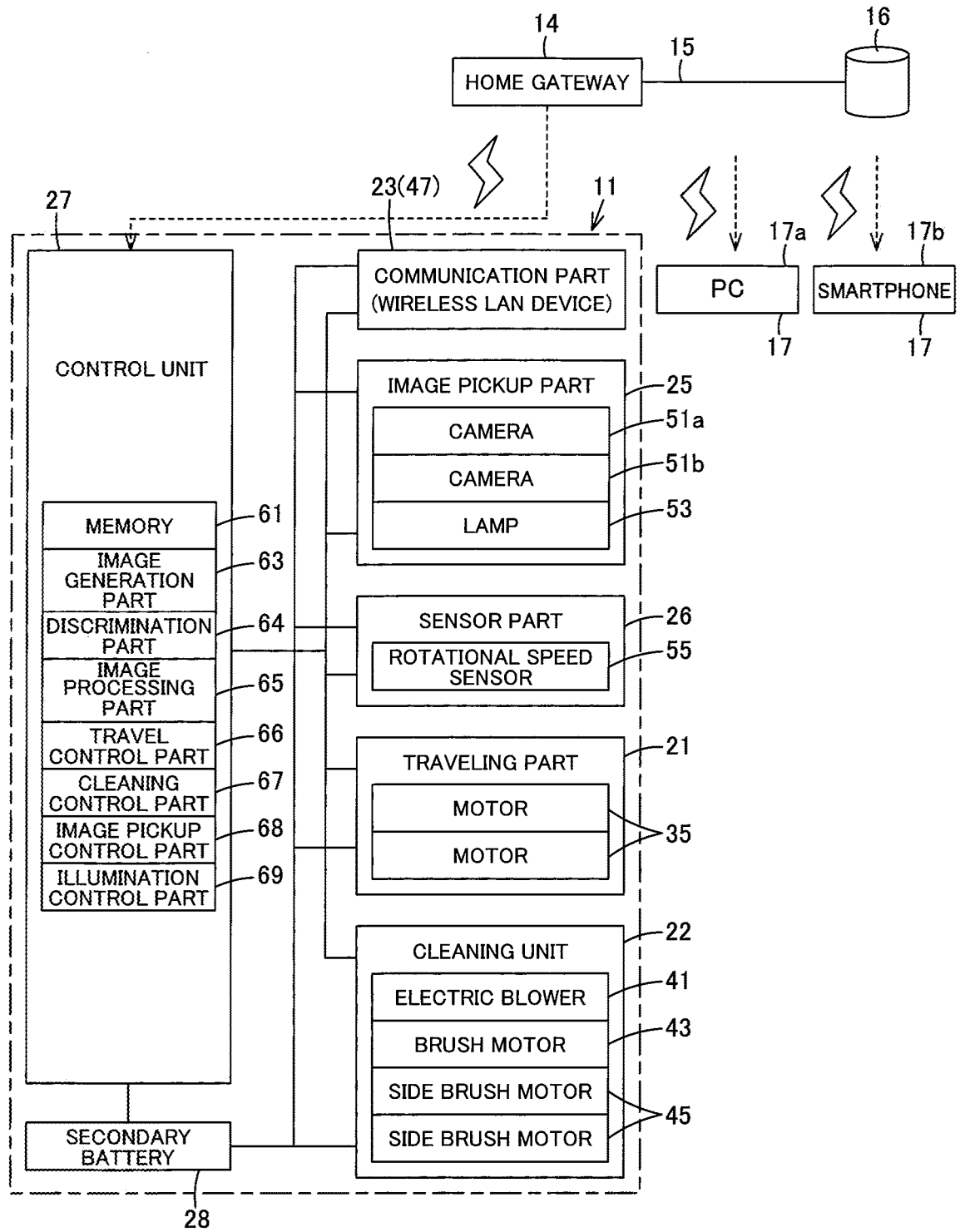
FIG. 1 is a block diagram showing an internal structure of a vacuum cleaner according to a first embodiment.

Hereinbelow, a first embodiment will be described in terms of its constitution with reference to the accompanying drawings.

In FIG. 1 to FIG. 4, reference sign 11 denotes a vacuum cleaner. This vacuum cleaner 11 constitutes a vacuum cleaner device (vacuum cleaner system) in combination with a charging device (charging stand) 12 (FIG. 4) as a station device serving as abase station for charging of the vacuum cleaner 11. Then, the vacuum cleaner 11, in this embodiment, is a so-called self-propelled robot cleaner (cleaning robot) which cleans a floor surface that is a cleaning-object surface as a traveling surface while autonomously traveling (self-propelled to travel) on the floor surface, the vacuum cleaner being enabled to perform wired or wireless communication with a general-purpose server 16 as data storage means (a data storage part) or a general-purpose external device 17 as display means (a display part) via an (external) network 15 such as the Internet, for example, by performing communication (signal transmission and reception) with a home gateway (router) 14 as relay means (a relay part) disposed in a cleaning area or the like by using wired communication or wireless communication such as Wi-Fi (registered trademark) or Bluetooth (registered trademark).

Also, the vacuum cleaner 11 includes a hollow main casing 20, a traveling part 21 for making the main casing 20 travel on a floor surface, a cleaning unit 22 for cleaning dust and dirt on the floor surface or the like, a communication part 23 for performing communication with an external device including the charging device 12, an image pickup part 25 for picking up images, a sensor part 26, control means (a control unit) 27 which is a controller for controlling the traveling part 21, the cleaning unit 22, the communication part 23, the image pickup part 25 and the like, and a secondary battery 28 for supplying electric power to the traveling part 21, the cleaning unit 22, the communication part 23, the image pickup part 25, the sensor part 26, the control means 27 and the like. In addition, the following description will be given on the assumption that a direction extending along the traveling direction of the vacuum cleaner 11 (main casing 20) is assumed as a back-and-forth direction (directions of arrows FR and RR shown in FIG. 2) while a left-and-right direction (directions toward both sides) intersecting (orthogonally crossing) the back-and-forth direction is assumed as a widthwise direction.

The main casing 20 is formed into a flat columnar shape (disc shape) or the like from a synthetic resin as an example. That is, the main casing 20 includes a side surface portion 20a, and an upper surface portion 20b (FIG. 2) and a lower surface portion 20c (FIG. 3) continuing from an upper portion and a lower portion of the side surface portion 20a, respectively. The side surface portion 20a of the main casing 20 is formed into a generally cylindrical-surface shape. The image pickup part 25 and the like as an example are disposed in the side surface portion 20a. Also, the upper surface portion 20b and the lower surface portion 20c of the main casing 20 are each formed into a generally circular shape, where a suction port 31 serving as a dust-collecting port, an exhaust port 32 and the like are opened in the lower surface portion 20c facing the floor surface, as shown in FIG. 3.

The traveling part 21 includes driving wheels 34, 34 as a plurality (pair) of driving parts, motors 35, 35 (FIG. 1) being driving means as operating parts for driving the driving wheels 34, 34, a swing wheel 36 for swinging use, and the like.

Each of the driving wheels 34 makes the vacuum cleaner 11 (main casing 20) travel (autonomously travel) in a forward direction and a backward direction on the floor surface, that is, serves for traveling use. The driving wheels 34, 34 having an unshown rotational axis extending along a left-and-right widthwise direction, are disposed widthwise symmetrical to each other.

Each of the motors 35 (FIG. 1) is disposed, for example, in correspondence with each of the driving wheels 34, and is enabled to drive each of the driving wheels 34 independently of each other.

The swing wheel 36, which is positioned at a generally central and front portion of the lower surface portion 20c of the main casing 20 in the widthwise direction, is a driven wheel swingable along the floor surface.

The cleaning unit 22 includes an electric blower 41 which is positioned, for example, within the main casing 20 to suck dust and dirt along with air through the suction port 31 and discharge exhaust air through the exhaust port 32, a rotary brush 42 as a rotary cleaner which is rotatably attached to the suction port 31 to scrape up dust and dirt, as well as a brush motor 43 (FIG. 1) for rotationally driving the rotary brush 42, side brushes 44 which are auxiliary cleaning means (auxiliary cleaning parts) as swinging-cleaning parts rotatably attached on both sides of the main casing 20 on its front side or the like to scrape together dust and dirt, as well as side brush motors 45 (FIG. 1) for driving the side brushes 44, a dust-collecting unit 46 (FIG. 2) which communicates with the suction port 31 to accumulate dust and dirt, and the like. In addition, with respect to the electric blower 41, the rotary brush 42 as well as the brush motor 43 (FIG. 1), and the side brushes 44 as well as the side brush motors 45 (FIG. 1), it is allowable that at least any one of these members is provided.

The communication part 23 shown in FIG. 1 includes a wireless LAN device 47 as wireless communication means (a wireless communication part) for performing wireless communication with the external device 17 via the home gateway 14 and the network 15 and as cleaner signal receiving means (a cleaner signal receiving part); unshown transmission means (a transmission part) such as an infrared emitting element, for example, for transmitting wireless signals (infrared signals) to the charging device 12 (FIG. 4) and the like; and unshown receiving means (a reception part) such as a phototransistor for receiving wireless signals (infrared signals) from the charging device 12 or an unshown remote control and the like. In addition, the communication part 23 may be installed with an access point function, and it may perform wireless communication directly with the external device 17, not via the home gateway 14, for example. Also, a web server function may also be added to the communication part 23, for example.

The wireless LAN device 47 performs transmission and reception of various types of information with the network 15 from the vacuum cleaner 11 via the home gateway 14.

The image pickup part 25 includes cameras 51a, 51b as (one and the other) image pickup means (image pickup part bodies), and a lamp 53 such as an LED as illumination means (an illumination part) for illumination to these cameras 51a, 51b.

Figure 2:
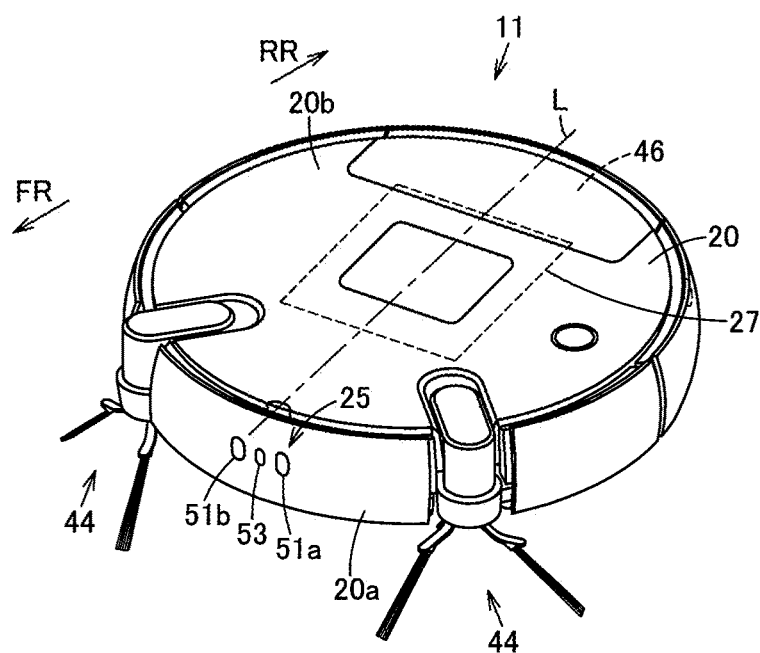
FIG. 2 is a perspective view showing the above vacuum cleaner.
Figure 3:
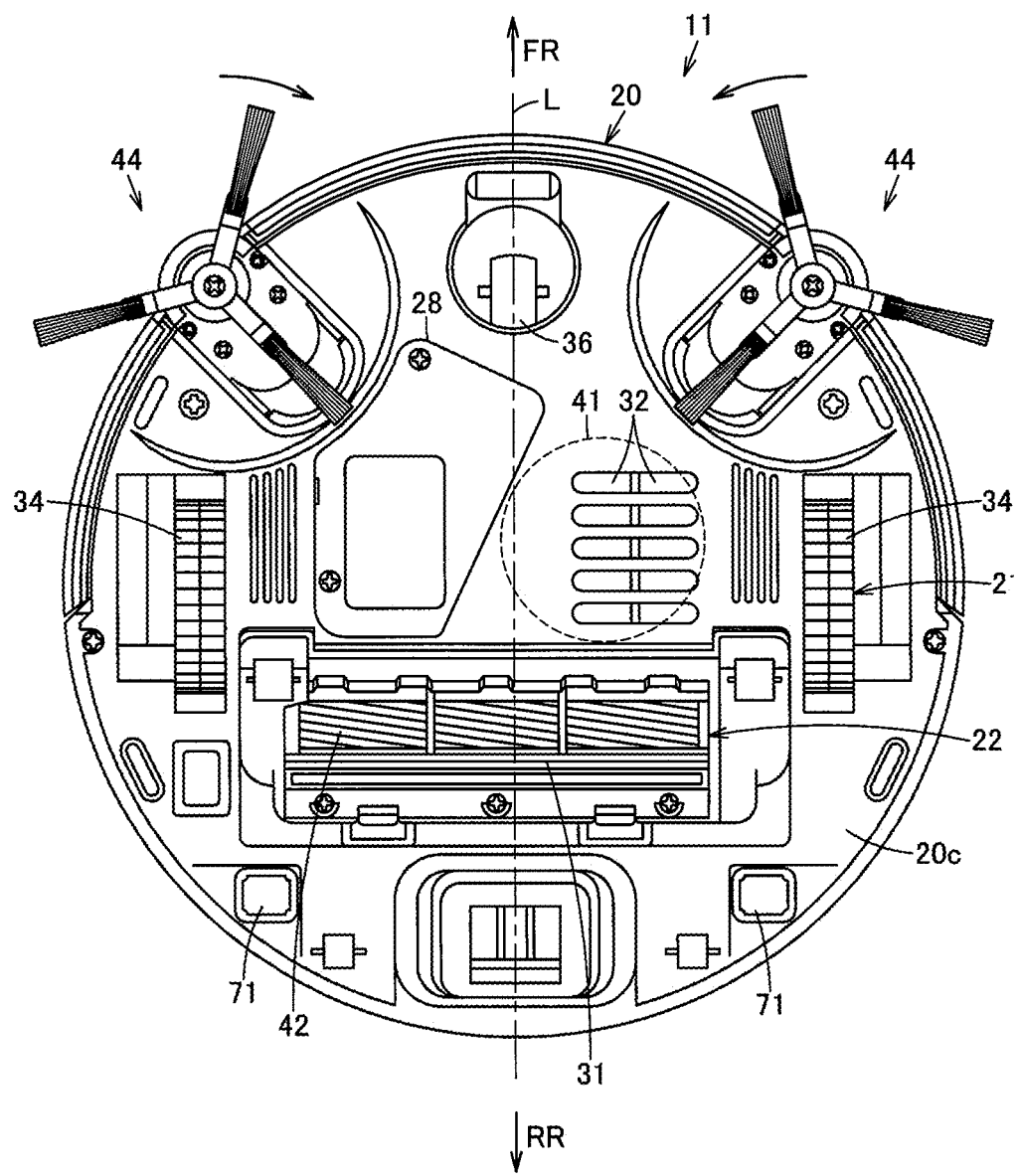
FIG. 3 is a plan view showing the above vacuum cleaner as viewed from below.
Figure 5:
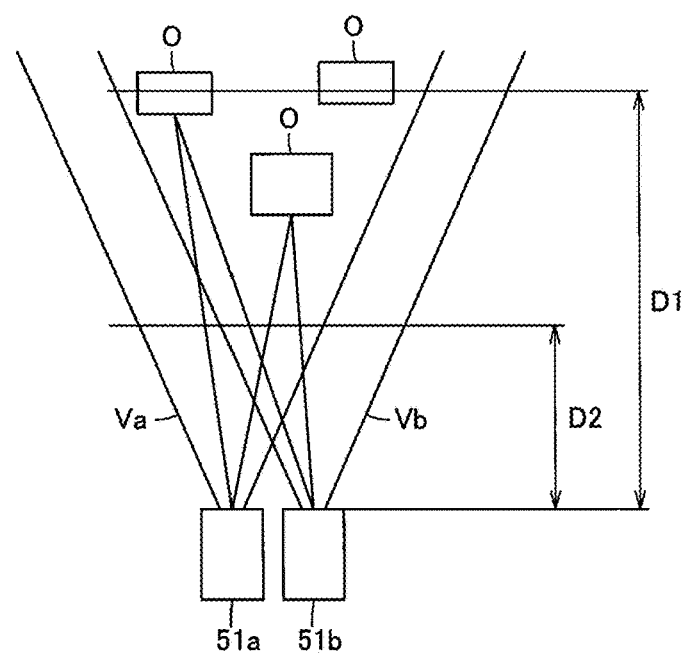
FIG. 5 is an explanatory view schematically showing a method for calculating a distance to an object by the above vacuum cleaner.

As shown in FIG. 2, the cameras 51a, 51b are disposed on both sides of a front portion in the side surface portion 20a of the main casing 20. That is, in this embodiment, the cameras 51a, 51b are disposed in the side surface portion 20a of the main casing 20 at positions which are skewed by a generally equal specified angle (acute angle) in the left-and-right direction with respect to a widthwise center line L of the vacuum cleaner 11 (main casing 20), respectively. In other words, these cameras 51a, 51b are disposed generally symmetrically in the widthwise direction with respect to the main casing 20, and a center position of these cameras 51a, 51b is generally coincident with a center position of the widthwise direction intersecting (orthogonally crossing) the back-and-forth direction, which is the traveling direction of the vacuum cleaner 11 (main casing 20). Further, these cameras 51a, 51b are disposed at generally equal positions in an up-and-down direction, that is, generally equal height positions. Therefore, these cameras 51a, 51b are set generally equal in height with each other from a floor surface while the vacuum cleaner 11 is set on the floor surface. Accordingly, the cameras 51a, 51b are disposed at mutually separated shifted positions (positions shifted in the left-and-right direction). Also, the cameras 51a, 51b are digital cameras which pick up digital images of a forward direction, which is the traveling direction of the main casing 20, at specified horizontal angles of view (e.g., 105°) and at specified time intervals, e.g., at a micro-time basis such as several tens of milliseconds or at a several-second basis. Further, these cameras 51a, 51b have their image pickup ranges (fields of view) Va, Vb overlapping with each other (FIG. 5), so that (one and the other) images P1a, P1b (FIG. 6(a) and FIG. 6(b)) picked up by these cameras 51a, 51b have their image pickup regions overlapping in the left-and-right direction with each other in a part of those regions containing a forward position resulting from extending the widthwise center line L of the vacuum cleaner 11 (main casing 20). In this embodiment, the cameras 51a, 51b are so designed to pick up images of a visible light region as an example. In addition, images picked up by the cameras 51a, 51b may be compressed into a specified data format, for example, by an unshown image processing circuit or the like.

The lamp 53 serving to emit illuminating light for image pickup by the cameras 51a, 51b is disposed at the intermediate position between the cameras 51a, 51b, that is, at a position on the center line L in the side surface portion 20a of the main casing 20. That is, the lamp 53 is distanced generally equally from the cameras 51a, 51b. Also, the lamp 53 is disposed at a generally equal position in the up-and-down direction, that is, a generally equal height position, to the cameras 51a, 51b. Accordingly, the lamp 53 is disposed at a generally center portion in the widthwise direction between the cameras 51a, 51b. In this embodiment, the lamp 53 is designed to illuminate light containing the visible light region.

The sensor part 26 shown in FIG. 1 includes, for example, a rotational speed sensor 55 such as an optical encoder for detecting rotational speed of each of the driving wheels 34 (each of the motors 35). Based on measured rotational speed of the driving wheels 34 (FIG. 3) or the motors 35, the rotational speed sensor 55 detects swing angle or progressional distance of the vacuum cleaner 11 (main casing 20 (FIG. 3)). Therefore, the rotational speed sensor 55 is a position detection sensor for detecting a relative position of the vacuum cleaner 11 (main casing 20 (FIG. 3)) from a reference position such as the charging device 12 (FIG. 4) as an example.

The control means 27 is, for example, a microcomputer including a CPU which is a control means main body (control unit main body), a ROM which is a storage section in which fixed data such as programs to be read by the CPU have been stored, a RAM which is an area storage section for dynamically forming various memory areas such as a work area serving as a working region for data processing by programs, and the like (where these component members are not shown). The control means 27 further includes, for example, a memory 61 which is storage means (a storage part) for storing therein image data picked up by the cameras 51a, 51b and the like, an image generation part 63 as distance image generation means (a distance image generation part) for calculating a distance (depth) to an object (feature point) from the cameras 51a, 51b based on images picked up by the cameras 51a, 51b, and then generating a distance image based on the calculated distance to the object, a discrimination part 64 as discrimination means for discriminating whether or not the picked-up object in the distance image generated by the image generation part 63 is an obstacle, and an image processing part 65 as map generation means (a map generation part) for generating a map of a cleaning area based on obstacle discrimination implemented by the discrimination part 64, and the like. Also, the control means 27 includes a travel control part 66 for controlling operation of the motors 35, 35 (driving wheels 34, 34 (FIG. 3)) of the traveling part 21, a cleaning control part 67 for controlling operation of the electric blower 41, the brush motor 43 and the side brush motors 45 of the cleaning unit 22, an image pickup control part 68 for controlling the cameras 51a, 51b of the image pickup part 25, an illumination control part 69 for controlling the lamp 53 of the image pickup part 25, and the like. Then, the control means 27 has, for example, a traveling mode for driving the driving wheels 34, 34 (FIG. 3), that is, the motors 35, 35, to make the vacuum cleaner 11 (main casing 20 (FIG. 3)) autonomously travel, a charging mode for charging the secondary battery 28 via the charging device 12 (FIG. 4), and a standby mode applied during a standby state.

The memory 61 is, for example, a nonvolatile memory such as a flash memory for holding various types of stored data regardless of whether the vacuum cleaner 11 is powered on or off.

The image generation part 63 uses a known method to calculate a distance to an object (feature point) based on images picked up by the cameras 51a, 51b and the distance between the cameras 51a, 51b, and also generates a distance image showing the calculated distance to the object (feature point). That is, the image generation part 63, for example, in which triangulation is applied based on a distance from the cameras 51a, 51b to an object (feature point) O and the distance between the cameras 51a, 51b (FIG. 5), detects pixel dots indicative of identical positions from within individual images picked up by the cameras 51a, 51b and calculates angles of the pixel dots in the up-and-down direction and the left-and-right direction to calculate a distance from the cameras 51a, 51b at that position based on those angles and the distance between the cameras 51a, 51b. Therefore, it is preferable that images to be picked up by the cameras 51a, 51b overlap with each other as much as possible. Also, generation of this distance image by the image generation part 63 is implemented by displaying calculated pixel-dot-basis distances that are converted to visually discernible gradation levels such as brightness, color tone or the like on a specified dot basis such as a one-dot basis. In this embodiment, the image generation part 63 generates a distance image which is a black-and-white image whose brightness decreases more and more with increasing distance, that is, as a gray-scale image of 256 levels ($=2^8$ with 8 bits) as an example which increases in blackness with increasing distance and increases in whiteness with decreasing distance in a forward direction from the vacuum cleaner 11 (main casing 20). Accordingly, the distance image is obtained by, as it were, visualizing a mass of distance information (distance data) of objects positioned within image pickup ranges of the cameras 51a, 51b located forward in the traveling direction of the vacuum cleaner 11 (main casing 20). The image generation part 63 generates a distance image only with regards to the pixel dots within a specified image range in each of images picked up by the cameras 51a, 51b.

Figures 7A, 7B:
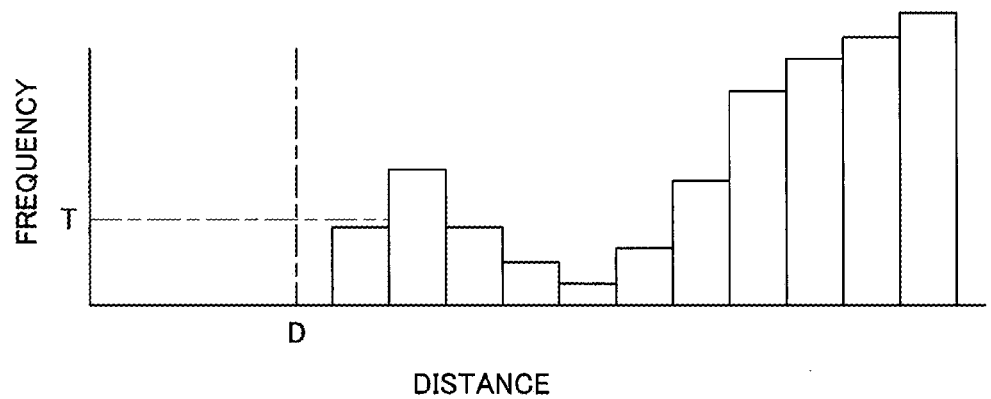
FIG. 7A is an explanatory view showing an example of a histogram to be used for obstacle discrimination by the discrimination part of the above vacuum cleaner.
FIG. 7B is an explanatory view showing an example of a histogram when the vacuum cleaner travels forward from the state of FIG. 7A.

The discrimination part 64 discriminates, based on the distance image generated by the image generation part 63, whether or not the object picked up by the cameras 51a, 51b is an obstacle, that is, whether or not any obstacle which obstructs traveling is present ahead. Specifically, the discrimination part 64 compares a distance to an object (feature point) in the distance image generated by the image generation part 63 (numerical data in terms of distances of pixel dots constituting the distance image), with a set distance which is a specified threshold having been previously set or variably set. In the case where the object (feature point) is positioned at the set distance (distance from the vacuum cleaner 11 (main casing 20)) or closer, the discrimination part 64 discriminates that the object (feature point) is an obstacle, while in the case where the object (feature point) is not positioned at the set distance (distance from the vacuum cleaner 11 (main casing 20)) or closer, the discrimination part 64 discriminates that the object (feature point) is not an obstacle. In more detail, in the embodiment, the discrimination part 64 manages distance information of pixel dots (object (feature point)) in the distance image as frequency data by using a histogram showing, as frequency, a number of pixels per a specified distance width (bin) (examples are shown in FIG. 7A and FIG. 7B). Based on the comparison between the frequency of the distance width including the set distance in the histogram and a preset frequency threshold, the discrimination part 64 discriminates that an object corresponding to an obstacle is picked up in the distance image in the case where a frequency of a distance closer than the specified set distance is equal to or above the specified frequency threshold.

Here, if the specified image ranges respectively set by the image generation part 63 and the discrimination part 64 satisfy the following large/small relation: (the image range set by the image generation part 63) (the image range set by the discrimination part 64), they may not necessarily be identical to each other. However, since it is preferable that these image ranges be identical to each other when processing is more simplified, the following description will be given on the assumption that these image ranges are identical to each other. Also, sizes of these image ranges are determined in accordance with the set distance set by the discrimination part 64. Specifically, the image range is set smaller in the case of the set distance set larger (farther) by the discrimination part 64. The image range may be set proportionally to the set distance, or an optimum image range may be selected among plural preset image ranges in accordance with large/small relation between the set distance and single or plural thresholds set with respect to the set distance. The image range is set similar to the external shape of the main casing 20 in accordance with the set distance. That is, the image range is set in accordance with the external shape (up-and-down and left-and-right magnitudes) of the vacuum cleaner 11 (main casing 20) in the case where the vacuum cleaner (main casing 20) is positioned at the set distance from the cameras 51a, 51b. In the embodiment, since the main casing 20 is formed into a flat generally-columnar shape (generally disc-shape), the image range is set in a square shape long in the left-and-right direction (laterally long square shape). In other words, the image range is set so that the vacuum cleaner 11 (main casing 20) traveling linearly as is by the set distance will be brought into contact with the image range. The set distance for the discrimination part 64 may be set appropriately in accordance with traveling speed or a traveling mode of the vacuum cleaner 11 (main casing 20), or can be input arbitrarily by a user.

The image processing part 65 calculates a positional relation between the cleaning area in which the vacuum cleaner (main casing 20) is disposed and an object or the like positioned within this cleaning area, based on a distance to the object (feature point) discriminated as an obstacle by the discrimination part 64 and a position of the vacuum cleaner 11 (main casing 20) detected by the rotational speed sensor 55 of the sensor part 26, so as to generate a map. In addition, the image processing part 65 is not an essential element.

The travel control part 66 controls magnitude and a direction of currents flowing through the motors 35, 35 to make the motors 35, 35 rotated forward or reverse, thereby controlling the drive of the motors 35, 35. By controlling the drive of the motors 35, 35, the travel control part 66 controls the drive of the driving wheels 34, 34 (FIG. 3).

The cleaning control part 67 controls conduction amounts of the electric blower 41, the brush motor 43 and the side brush motors 45 independently of one another, to control the drive of the electric blower 41, the brush motor 43 (rotary brush 42 (FIG. 3)) and the side brush motors 45 (side brushes 44 (FIG. 3)). In addition, control units may be provided in correspondence with the electric blower 41, the brush motor and the side brush motors 45 independently and respectively.

The image pickup control part 68, including a control circuit for controlling operation of shutters of the cameras 51a, 51b, operates the shutters at every specified time interval, thus exerting control to pick up images by the cameras 51a, 51b at every specified time interval.

The illumination control part 69 controls turn-on and -off of the lamp 53 via a switch or the like. The illumination control part 69, including a sensor for detecting brightness around the vacuum cleaner 11 in the embodiment, makes the lamp 53 lit when the brightness detected by the sensor is a specified level or lower, and otherwise, keeps the lamp 53 unlit.

Figure 4:
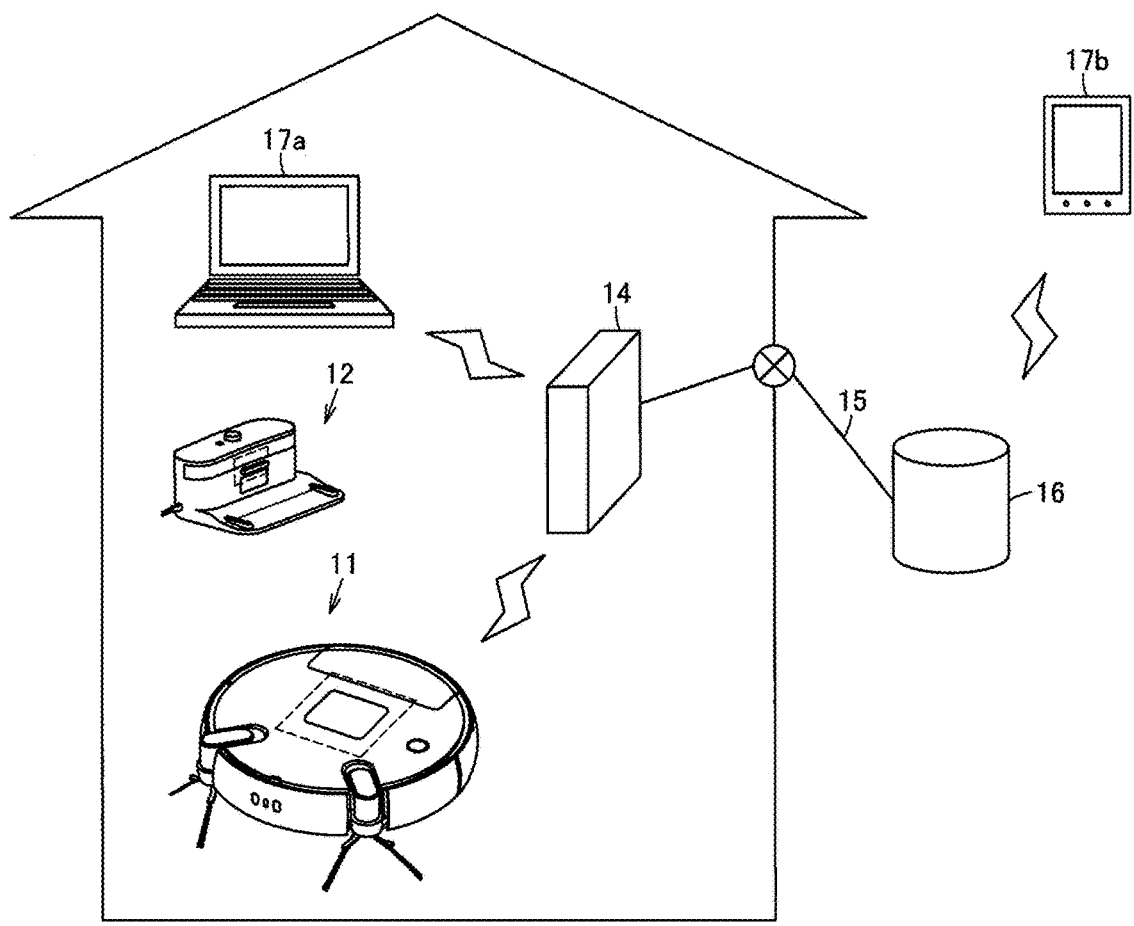
FIG. 4 is an explanatory view schematically showing a vacuum cleaner system including the above vacuum cleaner.

The secondary battery 28 is electrically connected to charging terminals 71, 71 as connecting parts exposed on both sides of a rear portion in the lower surface portion 20c of the main casing 20 shown in FIG. 3 as an example. With the charging terminals 71, 71 electrically and mechanically connected to the charging device 12 (FIG. 4) side, the secondary battery 28 is charged via the charging device 12 (FIG. 4).

The home gateway 14 shown in FIG. 1, which is also called an access point or the like, is installed inside a building and connected to the network 15 by wire as an example.

The server 16 is a computer (cloud server) connected to the network 15 and capable of storing therein various types of data.

The external device 17 is, for example, a general-purpose device such as a PC (tablet terminal (tablet PC)) 17a or a smartphone (mobile phone) 17b which is enabled to make wired or wireless communication with the network 15 via the home gateway 14 as an example inside a building and which is enabled to make wired or wireless communication with the network 15 outside the building. This external device 17 has at least a display function of displaying images.

Next, operation of the above-described first embodiment will be described.

In general, work of a vacuum cleaner device is roughly divided into cleaning work for carrying out cleaning by the vacuum cleaner 11, and charging work for charging the secondary battery 28 with the charging device 12. The charging work is implemented by a known method using a charging circuit such as a constant current circuit contained in the charging device 12. Therefore, only the cleaning work will be described below. Also, there may also be included image pickup work for picking up an image of a specified object by at least one of the cameras 51a, 51b in response to an instruction from the external device 17 or the like.

In the vacuum cleaner 11, at a timing such as an arrival at a preset cleaning-start time or reception of a cleaning-start instruction signal transmitted by a remote control or the external device 17, the control means 27 is switched over from the standby mode to the traveling mode, so that the control means 27 (travel control part 66) drives the motors 35, 35 (driving wheels 34, 34) to make the vacuum cleaner 11 move apart from the charging device 12 by a specified distance.

Then, in the vacuum cleaner 11, the image processing part 65 generates a map of a cleaning area. When generating the map, in overview, the vacuum cleaner 11 calculates a distance to an object present in images picked up by the cameras 51a, 51b while traveling along an outer wall of the cleaning area and the like. Then, the vacuum cleaner 11 discriminates the wall and/or obstacle based on the calculated distance to generate the map based on the current position of the vacuum cleaner 11 (map generation mode).

Figure 6A:
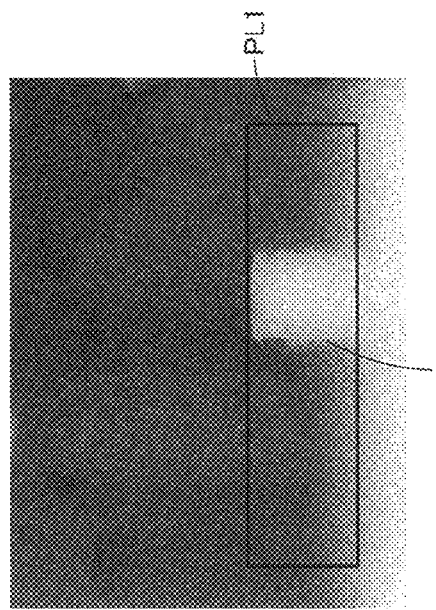
FIG. 6A is an explanatory view showing an example of an image picked up by one camera.
Figure 6B:
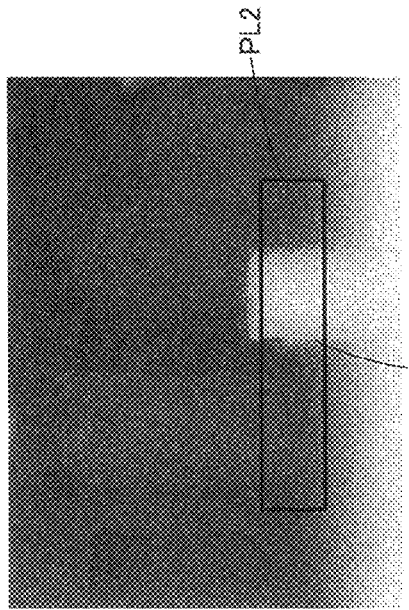
FIG. 6B is an explanatory view showing an example of an image picked up by the other camera.
Figure 8:
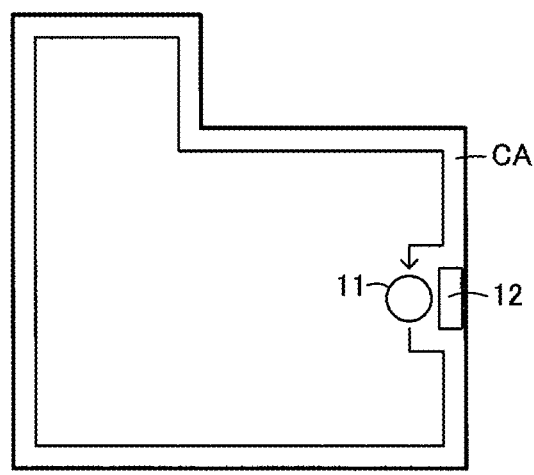
FIG. 8 is an explanatory view schematically showing a map generation method by a map generation part of the above vacuum cleaner.
Figure 9:
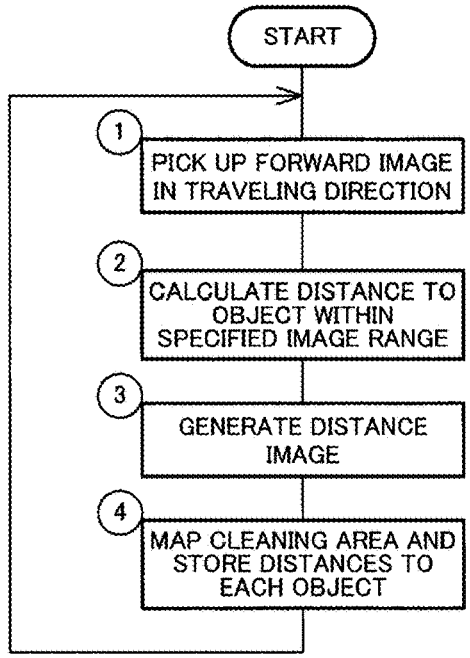
FIG. 9 is a flowchart showing travel control of the above vacuum cleaner during its map generation.

In more detail, referring to the flowchart shown in FIG. 9 and the like, first the control means 27 (travel control part 66) drives the motors 35, 35 (driving wheels 34, 34) so as to make the vacuum cleaner 11 (main casing 20) travel along an outer wall of a cleaning area CA, and further the cameras 51a, 51b driven (by the image pickup control part 68) pick up forward images in the traveling direction (step 1 in FIG. 8). At least any one of these picked-up images can be stored in the memory 61. Then, based on these images picked up by the cameras 51a, 51b and the distance between the cameras 51a, 51b, a distance to an object (feature point) within a specified image range is calculated by the image generation part 63 (step 2). Specifically, for example, in the case where the images P1a, P1b as shown in FIG. 6A and FIG. 6B are picked up by the cameras 51a, 51b, the image generation part 63 calculates a distance of each pixel dot within specified image ranges Ala, Alb of the images P1a, P1b. The image ranges Ala, Alb are the image ranges corresponding to a set distance D1 (FIG. 5) having one meter long as an example, which is a relatively large (far) set distance set by, for example, the discrimination part 64. Further, the image generation part 63 generates a distance image based on the calculated distance information (step 3). The discrimination part 64 discriminates obstacles such as a wall and the like based on the histogram showing, as frequency, a number of pixel dots per a specified distance width in the distance image. Then, the image processing part 65 roughly maps the external shape of the cleaning area CA (FIG. 8) and a layout therein based on the relative position of the vacuum cleaner 11 (main casing 20), that is, its own position, with respect to the discriminated obstacles and the charging device 12 (FIG. 8) detected by the rotational speed sensor 55 of the sensor part 26, and then stores the respective distances of the objects (feature points) in the memory 61 (step 4), and processing is returned to step 1. For example, upon discriminating that the whole cleaning area has been mapped, the control means 27 ends the map generation mode and is switched over to a cleaning mode which will be described later. In addition, the map, once stored in the memory 61 or the like upon its generation, may be read from the memory 61 for the next and subsequent cleaning, eliminating the need for generating a map for each event of cleaning. However, in view of cases where a cleaning area different to the map stored in the memory 61 is to be cleaned or where the cleaning area, even if unchanged from the stored one, is changed in terms of layout of objects or the like, the map may be generated as required in response to user's instruction as an example, or at specified periods or the like, or otherwise, the once generated map may be updated from time to time based on distance measurement of objects during the cleaning work.

The vacuum cleaner 11 next performs, based on the generated map, cleaning while autonomously traveling in the cleaning area (cleaning mode). During this autonomous traveling, in overview, the vacuum cleaner 11 calculates a distance to an object in images picked by the cameras 51a, 51b while traveling forward to discriminate the wall and/or obstacle based on the calculated distance and the generated map, and performs cleaning by the cleaning unit 22 while traveling and avoiding these wall and obstacles.

Figure 6C:
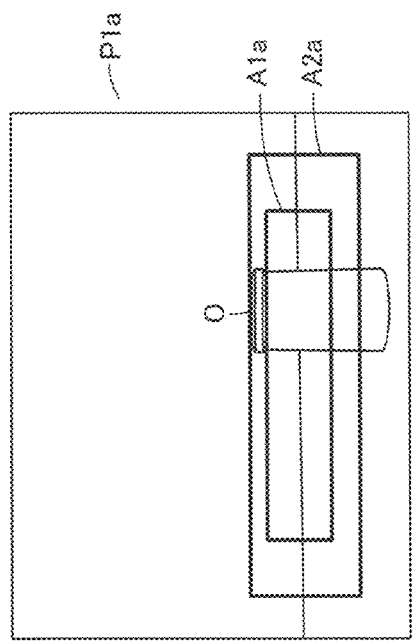
FIG. 6C is an explanatory view showing an example of a distance image generated based on FIG. 6A and FIG. 6B in the case of a relatively-small set distance.
Figure 6D:
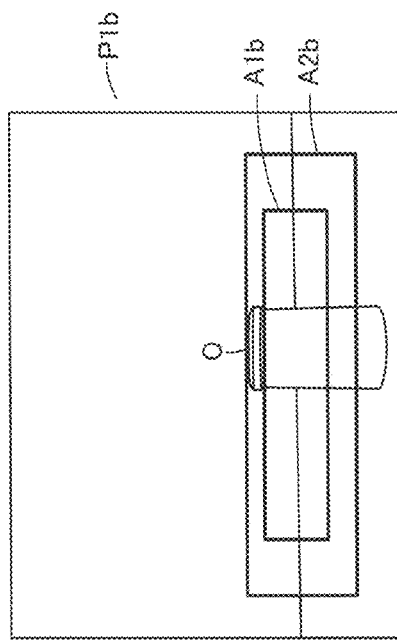
FIG. 6D is an explanatory view showing an example of a distance image generated based on FIG. 6A and FIG. 6B in the case of a relatively-large set distance.
Figure 10:
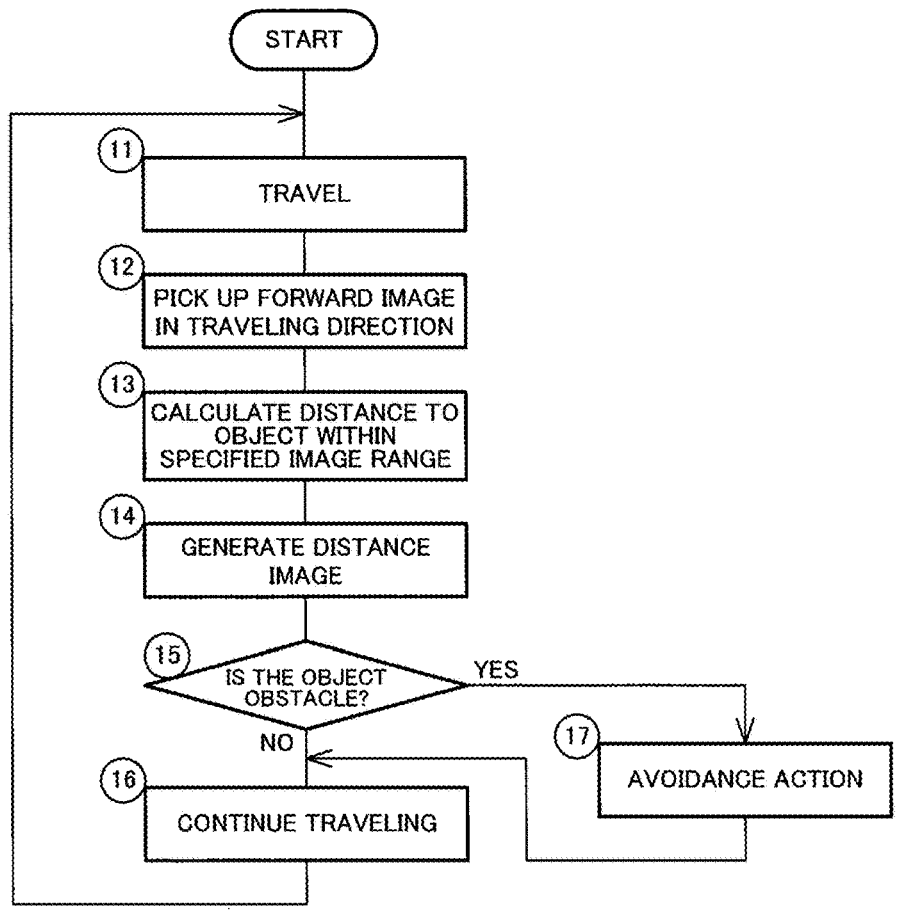
FIG. 10 is a flowchart showing travel control of the above vacuum cleaner.

In more detail, referring to the flowchart shown in FIG. 10 and the like, first, the control means 27 (travel control part 66) drives the motors 35, 35 (driving wheels 34, 34) so as to make the vacuum cleaner 11 (main casing 20) travel (step 11), and then the cameras 51a, Sib driven by the control means 27 (image pickup control part 68) pick up forward images in the traveling direction (step 12). These picked-up images can be stored in the memory 61. Then, based on these images picked up by the cameras 51a, 51b and the distance between the cameras 51a, 51b, the image generation part 63 calculates a distance to an object (feature point) within a specified image range (step 13). Specifically, for example, in the case where the images P1a, P1b as shown in FIG. 6A and FIG. 6B are picked up by the cameras Ma, 51b, the image generation part 63 calculates a distance of each pixel dot within specified image ranges Ala, Alb or specified image ranges A2a, A2b of the images P1a, P1b. The image ranges Ala, Alb are, for example, the image ranges corresponding to a set distance D1 (FIG. 5) which is a relatively large (far) set distance set by the discrimination part 64, while the image ranges A2a, A2b are, for example, the image ranges corresponding to a set distance D2 (FIG. 5) having thirty centimeters long as an example, which is a relatively small (close) set distance set by the discrimination part 64. Further, the image generation part 63 generates a distance image based on the calculated distance (step 14). FIG. 6C and FIG. 6D respectively show examples of distance images PL1 and PL2 generated by the image generation part 63. The distance images PL1, PL2 respectively show an example when the set distance set by the discrimination part 64 is relatively large (set distance D1 (FIG. 5)) and an example when the set distance is relatively small (set distance D2 (FIG. 5)). These distance images can also be stored in, for example, the memory 61. Then, based on the generated distance images, the discrimination part 64 compares the distance to the object (feature point) with the specified set distance to discriminate whether or not the object is present at the set distance or closer, that is, whether or not the object is an obstacle (whether or not there is any obstacle which obstructs traveling (advancing) ahead of the vacuum cleaner 11 (main casing 20)) (step 15). Specifically, based on the histogram showing, as frequency, a number of pixel dots per a specified distance width in the distance image, the discrimination part 64 discriminates that there is an object corresponding to an obstacle present at the set distance or closer in the case where the frequency of the distance width including the specified set distance is equal to or above a specified frequency threshold which has been previously set. For example, based on the histogram as shown in FIG. 7A showing, as frequency, a number of pixel dots per a specified distance width in the distance image, when the vacuum cleaner 11 (main casing 20) travels forward as is, the histogram is assumed to be the one shown in FIG. 7B with the all frequencies shifted toward smaller distance side.

When the frequency of the distance width (bin) including the set distance D (set distance D1 (FIG. 5) or set distance D2 (FIG. 5)) is equal to or above a frequency threshold T, the discrimination part 64 discriminates that there is an object corresponding to an obstacle at the specified distance or closer. Then in step 15 of the flowchart shown in FIG. 10, upon discriminating that the object is not an obstacle, the vacuum cleaner 11 (main casing 20) continues traveling as is (step 16), followed by proceeding back to step 11. The discrimination with regard to the object not corresponding to an obstacle includes, for example, the case of no object picked up in the images. On the other hand, in step 15, upon discriminating that the object is an obstacle, processing moves to a specified avoidance action routine (step 17). There are various methods for the avoidance action routine. In an example, the control means 27 (travel control part 66) controls the drive of the motors 35, 35 (driving wheels 34, 34) to stop the vacuum cleaner 11 (main casing 20), and then make the vacuum cleaner 11 (main casing 20) swing to change its traveling direction at the stopped position or a position to which the vacuum cleaner 11 (main casing 20) retreats by a specified distance. After this avoidance action routine, processing moves to step 16 in which the vacuum cleaner 11 continues traveling. As described above, while autonomously traveling all over the floor surface under avoidance of obstacles, the vacuum cleaner 11 (main casing 20) makes the control means 27 (cleaning control part 67) operate the cleaning unit 22 to clean dust and dirt on the floor surface. That is, the vacuum cleaner 11 continues operation in continuation such as continuing the cleaning work even if an obstacle is detected.

As for the cleaning unit 22, dust and dirt on the floor surface are collected to the dust-collecting unit 46 via the suction port 31 by the electric blower 41, the rotary brush 42 (brush motor 43) or the side brushes 44 (side brush motors 45) driven by the control means 27 (cleaning control part 67). Then, in the vacuum cleaner 11, the control means 27 (travel control part 66) controls the operation of the motors 35, 35 (driving wheels 34, 34) to return to the charging device 12, when the cleaning of the mapped cleaning area ends or when a specified condition is satisfied such as when the capacity of the secondary battery 28 is decreased to a specified level during the cleaning work, the specified level being insufficient for completion of cleaning or image pickup (the voltage of the secondary battery 28 has decreased to around a discharge termination voltage). Thereafter, when the charging terminals 71, 71 and terminals for charging of the charging device 12 are docked together, the cleaning work is ended and the control means 27 is switched over to the standby mode or the charging mode.

In addition, data of images stored in the memory 61 are transmitted to the server 16 via the home gateway 14 and the network 15 by means of the wireless LAN device 47, for example, upon a return of the vacuum cleaner 11 to the charging device 12, from time to time during the cleaning work, at specified time interval, in the event of a request from the external device 17, or the like. In addition, when data that have been transmitted completely are deleted from the memory 61 or overwritten when storing new data, the capacity of the memory 61 can be used efficiently.

The server 16 is enabled to store image data transmitted from the vacuum cleaner 11 and the image data may be downloaded in response to a request (access) from the external device 17.

Then, on the external device 17, an image downloaded from the server 16 is displayed.

As described above, in accordance with the first embodiment, the image generation part 63 generates a distance image of an object positioned on the traveling-direction side based on the images on the traveling-direction side of the main casing 20 picked up by the plurality of cameras 51a, 51b. In addition, the discrimination part 64 discriminates whether or not the picked-up object is an obstacle which obstructs traveling (advancing) based on the generated distance image, thereby enabling to improve obstacle detection precision and allowing the vacuum cleaner 11 (main casing 20) to travel stably, resulting in enabling to improve its traveling performance and cleaning performance.

Also, distance information of distance images is managed as frequency data, and the discrimination part 64 discriminates that the object in the distance image is an obstacle when a frequency of a distance closer than a specified set distance is equal to or above a specified frequency threshold. The discrimination is hardly affected by image noise, compared to the case of discriminating, for example, whether or not the object in the image is an obstacle based on whether or not at least one of the pixel dots indicates a specified set distance or above, resulting in providing more accurate obstacle discrimination.

Further, at least one of the cameras 51a, 51b (in the embodiment, the both of the cameras 51a, 51b) picks up an image of a visible light region. Thus, the picked-up image has favorable image quality, and can be easily displayed so as to be able to be seen by a user without implementing complicated image processing. In addition, with the light including a visible light region illuminated by the lamp 53, the cameras 51a, 51b can more surely pick up images even in dark location or night time.

Next, the second embodiment will be described referring to FIG. 11. In addition, with regard to the same constitution and action as the first embodiment described above, respectively the same reference sign is assigned and the description thereof is omitted.

The second embodiment provides different travel control during the cleaning mode in the first embodiment described above. Specifically, in accordance with the second embodiment, in the case where the discrimination part 64 discriminates that a picked-up object is an obstacle (there is an obstacle which obstructs traveling (advancing) ahead of the vacuum cleaner 11 (main casing 20)), after traveling speed of the main casing 20 (vacuum cleaner 11) by the driving wheels 34, 34, is relatively reduced, the set distance for discrimination by the discrimination part 64 is set smaller, and then, the discrimination part 64 re-discriminates whether or not the picked-up object is an obstacle, that is, whether or not there is an obstacle which obstructs traveling (advancing) ahead of the vacuum cleaner 11 (main casing 20).

Figure 11:
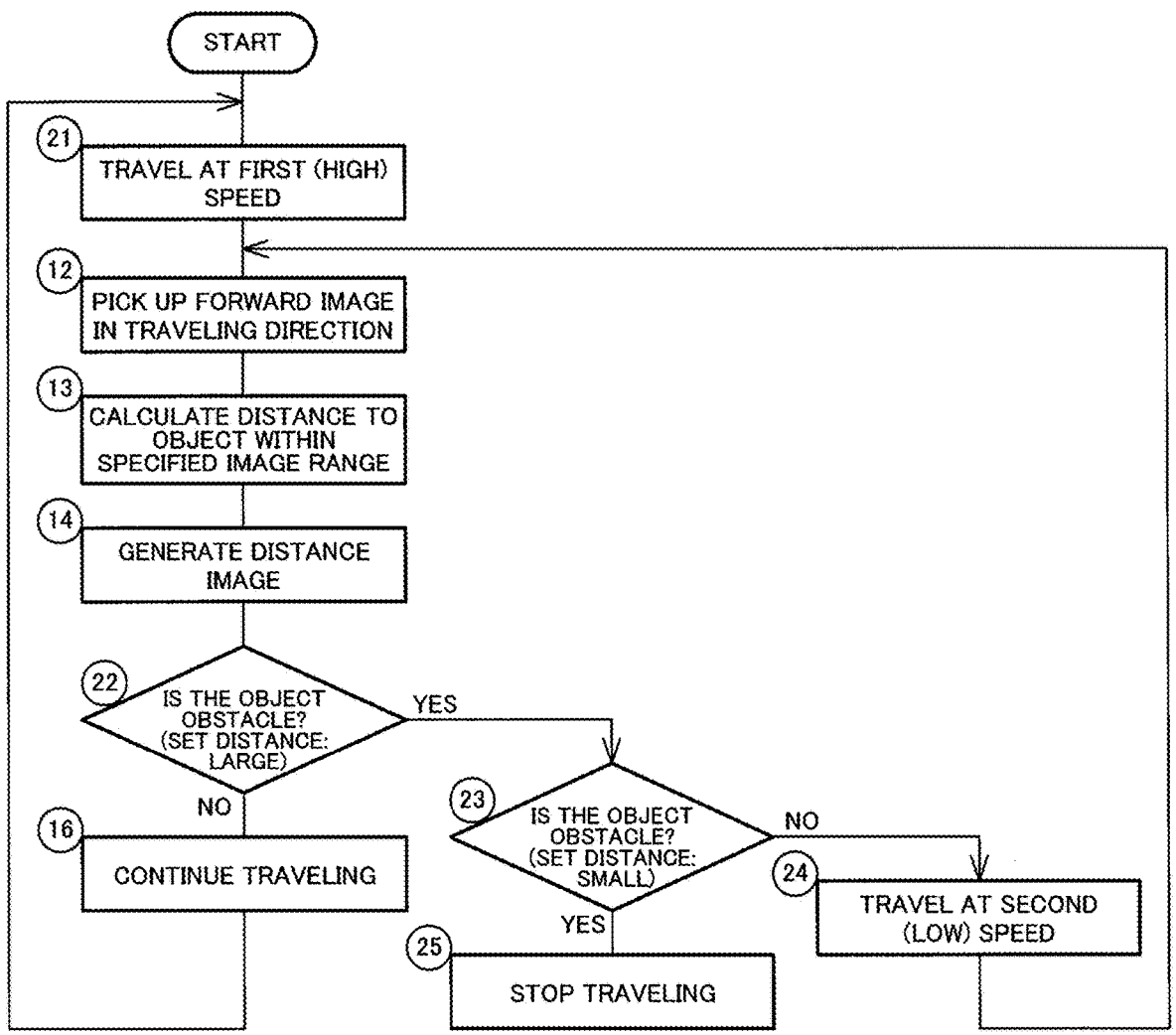
FIG. 11 is a flowchart showing travel control of a vacuum cleaner according to a second embodiment.

In more detail, referring to the flowchart in FIG. 11 as well, the control means 27 (travel control part 66) first drives the motors 35, 35 (driving wheels 34, 34) to make the vacuum cleaner 11 (main casing 20) travel at first speed which is relatively high (step 21), and then performs the controls in step 12 to step 14. Then, instead of step 15, the discrimination part 64 performs the control of step 22 in which the discrimination part 64 compares a distance to an object (feature point) with a specified set distance to discriminate whether or not the object is present at the set distance or closer, that is, whether or not the object is an obstacle. In this case, a set distance D1 (FIG. 5) which is relatively large (far) is used as the set distance. The description of the specific processing in step 22 which is the same as the one in step 15 is omitted. Then, in step 22, in the case where the discrimination part 64 discriminates that the object is not an obstacle (there is no obstacle ahead), processing is returned to step 21. On the other hand, in step 22, upon discriminating that the object is an obstacle (there is an obstacle ahead), the discrimination part 64 compares the distance to the object (feature point) with the specified set distance to discriminate whether or not there is any object at the set distance or closer, that is, whether or not the object is an obstacle (step 23). In this case, a set distance D2 (FIG. 5) which is relatively small (close) is used as the set distance. The description of the specific processing in step 23 which is the same as the one in step 15 is omitted. Then, in step 23, in the case where the object is discriminated not as an obstacle (there is no obstacle ahead), the control means 27 (travel control part 66) drives the motors 35, 35 (driving wheels 34, 34) to make the vacuum cleaner 11 (main casing 20) travel at second speed which is relatively low (step 24), that is, to reduce the traveling speed of the vacuum cleaner 11 (main casing 20), and then processing is returned to step 12. Also, in step 23, in the case where the object is discriminated as an obstacle (there is an obstacle ahead), that is, in the case where after the object is discriminated as an obstacle in step 22, the object is re-discriminated also as an obstacle in step 23, the control means 27 (travel control part 66) stops the motors 35, 35 (driving wheels 34, 34) to stop the traveling of the vacuum cleaner 11 (main casing 20) (step 25), so as to end the control.

As described above, upon discriminating that the picked-up object is an obstacle, the discrimination part 64 re-discriminates whether or not the object is an obstacle after a smaller distance is set as a specified set distance, thereby evaluating the picked-up object in more detail and resulting in enabling to improve obstacle detection precision.

Specifically, in the case where the discrimination part 64 discriminates that the picked-up object is an obstacle, after the control means 27 relatively reduces the traveling speed of the vacuum cleaner 11 (main casing 20), the discrimination part 64 sets the specified set distance smaller to re-discriminate whether or not the object is an obstacle. Thus, the picked-up object can be re-evaluated under different conditions, thereby suppressing misdetection of the obstacle.

Also, in the case where the discrimination part 64 re-discriminates that the object is an obstacle, the control means 27 stops the driving wheels 34, 34 to stop the traveling of the vacuum cleaner 11 (main casing 20), thus suppressing malfunction such as stranding of the vacuum cleaner 11 (main casing 20) on the obstacle by mistake, colliding with the obstacle, and the like.

In addition, in the second embodiment described above, in the case where the discrimination part 64 re-discriminates whether or not the object is an obstacle while traveling at slower traveling speed after discriminating that the object is an obstacle, the first speed and the second speed have been set. However, the same processing for the discrimination with regard to whether or not the object is an obstacle may be repeated three times or more while traveling at three different levels or more of reduced traveling speed. In this case, it is preferable that the specified set distance be set smaller (the image range of the distance image be set wider) in the case of the traveling speed being lower.

Also, upon discriminating that the object is an obstacle, the discrimination part 64 can, instead of traveling at lower speed, also re-discriminate whether or not the object is an obstacle after, for example, the vacuum cleaner 11 (main casing 20) is slightly turned by a specified angle. In this case also, the picked-up object can be re-evaluated under different conditions, resulting in enabling to suppress misdetection of the obstacle.

As described above, upon discriminating that the object is an obstacle, the discrimination part 64 performs plural times the discrimination regarding whether or not the object is an obstacle while changing conditions, resulting in enabling to improve obstacle detection precision.

Further, after discriminating that the object is an obstacle, the discrimination part 64 may, after turning of 180 degrees, perform the obstacle discrimination with respect to the avoidance direction.

Figure 12:
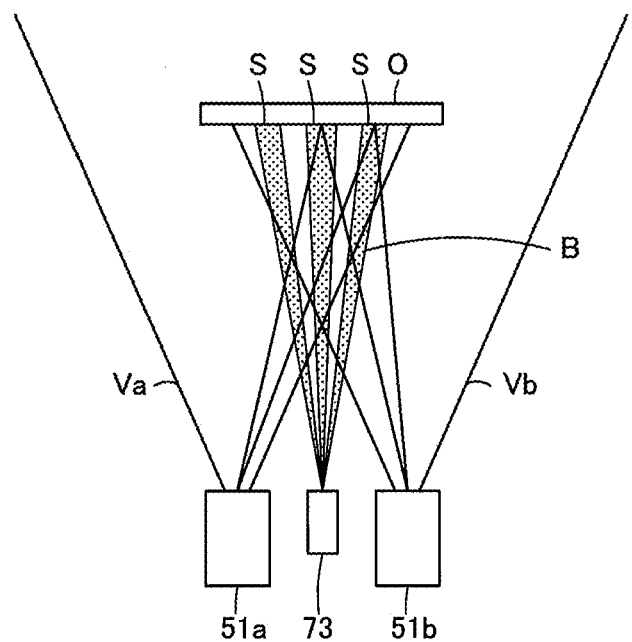
FIG. 12 is an explanatory view schematically showing a method for calculating a distance to an object by a vacuum cleaner according to a third embodiment.

Next, the third embodiment will be described referring to FIG. 12. In addition, with regard to the same constitution and action as the embodiments described above, respectively the same reference sign is assigned and the description thereof is omitted.

The third embodiment includes a beam irradiation part 73 as light emitting means (a light emitting part) different from the lamp 53, disposed between the cameras 51*a*, 51*b* in the embodiments described above.

The beam irradiation part 73 with a light-emitting element, for example, an LED or a semiconductor laser is configured to irradiate a light beam B such as visible light or infrared ray forward in the traveling direction of the main casing 20. The beam irradiation part 73 is disposed at the intermediate position between the cameras 51*a*, 51*b*, that is, at the position on the center line L in the side surface portion 20*a* of the main casing 20. That is, the beam irradiation part 73 is distanced generally equally from the cameras 51*a*, 51*b*. Accordingly, the beam irradiation part 73 can be disposed above or below the lamp 53, or at other position. The light beam B irradiated from the beam irradiation part 73 may include one beam or plural beams. In the embodiment, the beam irradiation part 73 irradiates plural beams as an example. It is preferable that these light beams B be irradiated within the image pickup ranges (fields of view) Va, Vb overlapping with each other respectively of the cameras 51*a*, 51*b*.

Then, since the light beams B irradiated from the beam irradiation part 73 are irradiated to an object O positioned ahead of the main casing 20 (vacuum cleaner 11), each of the light beams B is reflected as a spot S in the image picked up by the cameras 51*a*, 51*b*.

Accordingly, in the case of an object O being, for example, a wall uniform in color, transparent glass or the like which is hardly reflected directly in an image and thus the distance of which is not easily calculated based on the image, the spot S generated on the object O by the light beam B is used as a feature point of the object O for calculation of a distance to the spot S, thereby acquiring the distance to the object O based on the images picked up by the cameras 51*a*, 51*b*. This can further improve obstacle detection precision.

Also, irradiation of the light beams B within the image pickup ranges Va, Vb overlapping with each other of the cameras 51*a*, 51*b* for picking up images may lead to more reliable irradiation of the light beams B to an object O positioned forward in the traveling direction of the main casing 20 (vacuum cleaner 11), resulting in enabling to further improve detection precision of the object O.

Then, emission of the plural beams of the light beams B from the beam irradiation part 73 can lead to generation of a plurality of the spots S at mutually different positions on the object O. The distance to the object O can be calculated by use of the plurality of spots S, thus enabling to detect the distance to the object O more reliably. This further improves obstacle detection precision.

In addition, in the third embodiment described above, the beam irradiation part 73 may be disposed at a position shifted from the intermediate position between the cameras 51a, 51b, that is, from the center line L in the side surface portion 20a of the main casing 20 (disposed at a position different from the intermediate position between the cameras 51a, 51b). In this case, the distance to the object O can be acquired by implementing correction based on the position of the beam irradiation part 73 when calculating the distance to the spot S.

Figure 13:
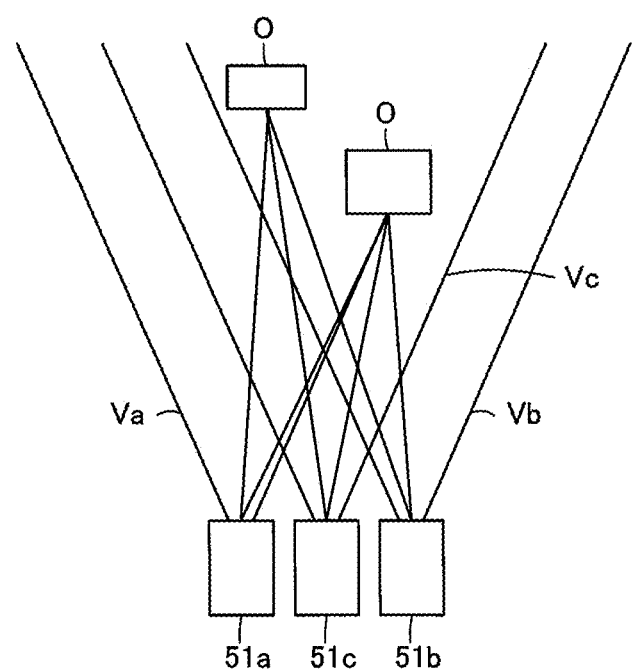
FIG. 13 is an explanatory view schematically showing a method for calculating a distance to an object by a vacuum cleaner according to a fourth embodiment.

Next, the fourth embodiment will be described referring to FIG. 13. In addition, with regard to the same constitution and action as the embodiments described above, respectively the same reference sign is assigned and the description thereof is omitted.

The fourth embodiment includes a camera 51c as image pickup means between the cameras 51a, 51b in the embodiments described above.

The camera 51c is disposed at the intermediate position between the cameras 51a, 51b, that is, at the position on the center line L in the side surface portion 20a of the main casing 20. That is, the camera 51c is distanced generally equally from the cameras 51a, 51b. Accordingly, the pitch between the cameras 51a, 51c and the pitch between the cameras 51c, 51b are the same with each other. In other words, these cameras 51a, 51c, 51b are disposed at generally equal intervals. That is, the pitch between the cameras 51a, 51c and the pitch between the cameras 51c, 51b are set to almost a half of the pitch between the cameras 51a, 51b. In other words, the cameras 51a, 51c, and the cameras 51c, 51b are configured each as a camera pair respectively disposed at a relatively narrow interval, while the cameras 51a, 51b are configured as a camera pair disposed at a relatively wide interval. These cameras 51a, 51b, 51c respectively have the image pickup ranges Va, Vb, Vc overlapping with each other, and thus the images picked up by these cameras 51a, 51b, 51c have the image pickup regions overlapping in the left-and-right direction with each other. In the embodiment, these cameras 51a, 51b, 51c are so designed to pick up images of a visible light region as an example. In addition, the images picked up by these cameras 51a, 51b, 51c may be compressed into a specified data format, for example, by an unshown image processing circuit or the like.

The lamp 53, unshown in figures, can be disposed respectively between the cameras 51a, 51c and between the cameras 51c, 51b, or may be disposed at a position distanced generally equally from the cameras 51a, 51b, 51c.

Also, the image generation part 63 uses a known method similar to the ones in the embodiments described above to calculate a distance to an object (feature point) based on images picked up by the cameras 51a, 51c disposed adjacent to each other and the distance between the cameras 51a, 51c disposed adjacent to each other, and further to calculate a distance to the objet (feature point) based on images picked up by the cameras 51c, 51b and the distance between the cameras 51c, 51b. Then, the image generation part 63 generates a distance image by use of the average of the respectively calculated distances to the object. As for the generation of the distance image, a distance image (intermediary distance image) is generated based on the distance to the object calculated based on the images picked up by the cameras 51a, 51c, and further, a distance image (intermediary distance image) is generated based on the distance to the object calculated based on the images picked up by the cameras 51c, 51b. Then, the average image of these intermediary distance images may be used as a distance image. Or, without generation of these intermediary distance images, a distance image may be directly generated based on the average value of the respectively-calculated distances to the object.

Accordingly, the discrimination part 64 discriminates whether or not the picked-up object is an obstacle, based on the distance image generated as the average value of the distance images generated based on the average value of the respective distances of the object in images respectively picked up by the paired cameras 51a, 51c, and the paired cameras 51c, 51b disposed adjacent with each other in each pair, thus reducing image noise and resulting in enabling to improve obstacle detection precision.

Also, the cameras 51a, 51c pick up images at a different camera angle from the camera angle of the cameras 51c, 51b, thereby enabling to pick up images of the object which cannot be picked up by one pair of cameras and resulting in enabling to improve obstacle detection precision.

Further, for example, in the case where a set distance is relatively large, the image generation part 63 may calculate a distance to an object based on images picked up by the cameras 51a, 51b disposed at a wide interval, that is, disposed not adjacent to each other. While in the case where a set distance is relatively small, the image generation part 63 may calculate a distance to an object based on images picked up by the cameras 51a, 51c and/or the cameras 51c, 51b respectively disposed at a narrow interval, that is, disposed adjacent to each other. Therefore, the image generation part 63 may generate a distance image based on a distance to an object calculated based on images picked up by the cameras 51a, 51b disposed at a wide interval, that is, disposed not adjacent to each other in the case where a set distance is relatively large as an example, while the image generation part 63 may generate a distance image based on a distance to an object calculated based on images picked up by the cameras 51a, 51c and/or the cameras 51c, 51b respectively disposed at a narrow interval, that is, disposed adjacent to each other in the case where a set distance is relatively small.

In the case of the image generation part 63 using triangulation for detection of a distance to an object, using cameras disposed at a narrower interval provides favorable distance calculation precision with respect to an object positioned closer. Thus, the image generation part 63 selectively uses images picked up by the cameras 51a, 51b and images picked up by the cameras 51a, 51c and/or the cameras 51c, 51b in accordance with the set distance being large or small, thereby enabling to further improve distance detection precision for object, that is, obstacle detection precision.

Further, some applications for discrimination by the discrimination part 64 may be available, for example, when the discrimination part 64 discriminates whether or not there is any obstacle which obstructs traveling, the image generation part 63 calculates a distance to an object based on images picked up by the cameras 51a, 51c and/or the cameras 51c, 51b respectively disposed at a narrow interval, that is, disposed adjacent to each other, and then the discrimination part 64 uses a distance image generated based on the calculated distance to the object, while when a map is generated, the image generation part 63 calculates a distance to an object based on images picked up by the cameras 51a, 51b respectively disposed at a wide interval, that is, disposed not adjacent to each other, and then the discrimination part 64 uses a distance image generated based on the calculated distance to the object.

In addition, in the fourth embodiment described above, four cameras or more may be set.

Also, in the above-described respectively embodiment, the cameras 51*a*, 51*b* (and the camera 51*c*) may be disposed at generally equal positions in the left-and-right direction on the main casing 20 (side surface portion 20*a*), that is, disposed above and below with each other.

Also, at least one of the cameras 51*a*, 51*b* (and the camera 51*c*) may be provided by an infrared camera for picking up images of infrared regions.

Also, for image display, in addition to a constitution including processing for enabling image display on the external device 17 by the control means 27, there may be adopted, for example, processing for enabling image display on the external device 17 with an exclusive-use program (application) installed in the external device 17, or otherwise, it is also allowed that after preprocessing is done by the control means 27 or the server 16, image display is implemented with a general-purpose program such as a browser of the external device 17 or the like. That is, a constitution in which display control means (a display control part) implements the image display may be adopted through the use of a program stored in the server 16, a program installed on the external device 17, and the like.

Further, although data of images or the like temporarily stored in the memory 61 are transmitted to the server 16 and stored in the server 16, the data may be stored in the memory 61 as it is or stored in the external device 17.

Also, images picked up by the cameras 51*a*, 51*b* or a distance image generated by the image generation part 63 may also be displayed, for example, on a display part provided in the vacuum cleaner 11 itself without being limited to the external device 17. In this case, there is no need to transmit data from the memory 61 to the server 16 via the home gateway 14 and the network 15, allowing the constitution and control of the vacuum cleaner 11 to be further simplified.

Further, as auxiliary aids for the detection of obstacles by the cameras 51*a*, 51*b*, there may be separately provided sensors such as a contact sensor for obstacle detection at positions out of the field of view of the cameras 51*a*, 51*b*, such as in a rear portion of the main casing 20, or step gap detection means (a step gap detection part) such as an infrared sensor for detecting step gaps of the floor surface or the like may be provided in the lower surface portion 20*c* of the main casing 20.

Then, although the image generation part 63, the discrimination part 64, the cleaning control part 67, the image pickup control part 68 and the illumination control part 69 are each provided in the control means 27, these members may also be provided as independent members, respectively, or two or more among these members may be arbitrarily combined with one another.

Further, the distance calculation by the image generation part 63 may be applied not only during cleaning work but also to any arbitrary use during traveling of the vacuum cleaner 11 (main casing 20).

Also, although the discrimination part 64 uses a histogram showing, as frequency, a number of pixels per a specified distance width (bin), to discriminate whether or not an object is an obstacle, the discrimination part 64 may directly compare a distance per a pixel dot with a set distance to discriminate whether or not an object is an obstacle.

Then, according to at least one of the above-described embodiments, since the image generation part 63 generates a distance image of an object positioned on the traveling-direction side based on images picked up by the cameras 51*a*, 51*b* (cameras 51*a*, 51*b*, 51*c*) disposed in the main casing 20 so as to be apart from each other, and moreover, since the discrimination part 64 discriminates whether or not the picked-up object is an obstacle based on the generated distance image, an object and its distance can be precisely detected without being affected by physical properties (softness, color, etc.) of the object and without overlooking small object, as compared with cases in which an infrared sensor or an ultrasonic sensor or the like is used as an example. Accordingly, the obstacle detection precision can be improved.

Specifically, since the discrimination part 64 discriminates that an object is an obstacle when the object in a distance image generated by the image generation part 63 is present closer than a specified set distance which has been previously set, an obstacle can be precisely detected by simple processing.

As a result, the drive of the driving wheels 34, 34 (motors 35, 35) is controlled so as to avoid the object which has been discriminated as an obstacle by the discrimination part 64. Thus, the precision of autonomous traveling can be improved so that the cleaning area can be efficiently cleaned more thoroughly.

Further, since the image generation part 63 generates a distance image by use of data within a specified image range from the data of the images picked up by the cameras 51*a*, 51*b* (cameras 51*a*, 51*b*, 51*c*), higher-speed processing is possible as compared with cases in which a distance image is generated by use of whole data of images picked up by the cameras 51*a*, 51*b* (cameras 51*a*, 51*b*, 51*c*).

Also, since the image generation part 63 changes image range in accordance with a specified set distance, an image processing only of a required range in accordance with the set distance can be implemented, thereby enabling to provide higher-speed processing.

Specifically, the image generation part 63 sets a relatively large image range in the case where a specified set distance is relatively small, while the image generation part 63 sets a relatively small image range in the case where a specified set distance is relatively large. Thus, in the case where a specified set distance is required to be set relatively large, for example, in the case where the vacuum cleaner 11 (main casing 20) travels at high speed or other cases, image processing is implemented only of the image range set relatively small, resulting in providing high-speed processing. While in the case where a specified set distance may be set relatively small, such as in the case where the vacuum cleaner 11 (main casing 20) travels at low speed or other cases, an image range is set relatively large, thereby enabling to further improve detection precision for objects corresponding to obstacles.

Accordingly, a set distance and an image range can be selectively used in accordance with usage, for example, traveling speed of the vacuum cleaner 11 (main casing 20).

Also, An image range is set similar to the external shape of the main casing 20 in accordance with a set distance corresponding to its image range, thereby enabling detection only of minimum essential obstacles which obstruct the advancing of the vacuum cleaner 11 (main casing 20). Accordingly, since an obstacle even being present at any position other than the expected positions has no effect on the advancing of the vacuum cleaner 11 (main casing 20), processing only within the image range makes it possible to sufficiently detect obstacles that obstruct the traveling, resulting in enabling to acquire sufficient effect of obstacle detection while performing high-speed processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

The control method for a vacuum cleaner as described above, comprising the step of generating the distance image by use of respective data within a specified image range among data of the images picked up by the plurality of image pickup means.

The control method for a vacuum cleaner as described above, comprising the step of, when the object in the generated distance image is present closer than a specified set distance which is previously set, discriminating that the object is an obstacle.

The control method for a vacuum cleaner as described above, comprising the step of changing the specified image range for generation of the distance image, in accordance with the specified set distance.

The control method for a vacuum cleaner as described above, comprising the step of setting the specified image range for generation of the distance image relatively large when the specified set distance is relatively small, and setting the specified image range for generation of the distance image relatively small when the specified set distance is relatively large.

The control method for a vacuum cleaner as described above, comprising the step of setting the specified image range for generation of the distance image, similar to an external shape of the main casing in accordance with the specified set distance.

The control method for a vacuum cleaner as described above, comprising the step of, upon discriminating that the object is an obstacle, setting the specified set distance smaller to re-discriminate whether or not the object is an obstacle.

The control method for a vacuum cleaner as described above, comprising the steps of, upon discriminating that the object is an obstacle, relatively reducing traveling speed of the main casing, and setting the specified set distance smaller to re-discriminate whether or not the object is an obstacle in a state in which the traveling speed of the main casing is relatively reduced.

The control method for a vacuum cleaner as described above, comprising the steps of, upon discriminating that the object is an obstacle, making the main casing swing, and then setting the specified set distance smaller to re-discriminate whether or not the object is an obstacle.

The control method for a vacuum cleaner as described above, comprising the step of, upon re-discriminating that the object is an obstacle, stopping traveling of the main casing.

The control method for a vacuum cleaner as described above, comprising the steps of managing distance information of the distance image as frequency data, and also discriminating that the object is an obstacle when a frequency of a distance closer than the specified set distance is equal to or above a specified value.

The control method for a vacuum cleaner as described above, comprising the step of generating the distance image based on an average value of distances to the object in the images picked up by respective two of the image pickup means disposed adjacent with each other among three or more of the image pickup means disposed so as to be distanced generally equally from each other.

The control method for a vacuum cleaner as described above, comprising the steps of, among three or more of the image pickup means set so as to include two disposed at a relatively narrow interval and two disposed at a relatively wide interval, generating the distance image based on images picked up by the two of the image pickup means disposed at the relatively narrow interval when the specified set distance is relatively small, and generating the distance image based on images picked up by the two of the image pickup means disposed at the relatively wide interval when the specified set distance is relatively large.

The control method for a vacuum cleaner as described above, comprising the steps of, among three of the image pickup means set so as to be disposed at generally equal intervals, generating the distance image based on images picked up by two of the image pickup means disposed not adjacent with each other when the specified set distance is relatively small, and generating the distance image based on images picked up by two of the image pickup means disposed adjacent with each other when the specified set distance is relatively large.

The control method for a vacuum cleaner as described above, comprising the steps of emitting a light beam of a wavelength to be able to be picked up by the image pickup means, and calculating a distance to a position on the object irradiated with the emitted light by calculating a distance of the light beam in the image.

The control method for a vacuum cleaner as described above, comprising the step of irradiating the light beam within image pickup ranges overlapping with each other of the plurality of image pickup means for picking up images.

The control method for a vacuum cleaner as described above, comprising the step of emitting a plurality of light beams.

The invention claimed is:
1. A vacuum cleaner comprising:
a main casing;
a driving wheel for enabling the main casing to travel;
a control unit for controlling drive of the driving wheel to thereby make the main casing autonomously travel;
a plurality of cameras disposed apart from each other in the main casing for picking up images on a traveling-direction side of the main casing;
a distance image generation part for generating a distance image of an object positioned on the traveling-direction side based on the images picked up by the plurality of cameras; and
a discrimination part for discriminating whether or not the picked-up object is an obstacle based on the distance image generated by the distance image generation part, wherein
the discrimination part discriminates that, when the object in the distance image generated by the distance image generation part is positioned closer than a specified set distance which is previously set, the object is an obstacle; and
upon discriminating that the object is an obstacle, the discrimination part sets the specified set distance smaller to re-discriminate whether or not the object is an obstacle by use of the same distance image which was used for the discrimination.

2. The vacuum cleaner in accordance with claim 1, wherein
the distance image generation part generates the distance image by use of respective data within a specified image range among data of the images picked up by the plurality of cameras.

3. The vacuum cleaner in accordance with claim 2, wherein
the distance image generation part sets the specified image range in accordance with the specified set distance set by the discrimination part.

4. The vacuum cleaner in accordance with claim 3, wherein
the distance image generation part sets the specified image range relatively large when the specified set distance is relatively small, and sets the specified image range relatively small when the specified set distance is relatively large.

5. The vacuum cleaner in accordance with claim 2, wherein
the distance image generation part sets the specified image range similar to an external shape of the main casing in accordance with the specified set distance.

6. The vacuum cleaner in accordance with claim 5, wherein
the control unit stops the driving wheel to stop traveling of the main casing when the discrimination part discriminates that the object is an obstacle as a result of the re-discrimination.

7. The vacuum cleaner in accordance with claim 1, wherein
when the discrimination part discriminates that the object is an obstacle, the control unit controls the driving wheel to relatively reduce traveling speed of the main casing, and
the discrimination part sets the specified set distance smaller to re-discriminate whether or not the object is an obstacle in a state in which the traveling speed of the main casing is relatively reduced by the control unit.

8. The vacuum cleaner in accordance with claim 1, wherein
the control unit makes the main casing swing when the discrimination part discriminates that the object is an obstacle, and
the discrimination part sets the specified set distance smaller to re-discriminate whether or not the object is an obstacle, after the control unit makes the main casing swing.

9. The vacuum cleaner in accordance with claim 1, wherein
the discrimination part discriminates that the object is an obstacle when a number of pixels in the distance image of a distance closer than the specified set distance is equal to or above a specified value.

10. The vacuum cleaner in accordance with claim 1, wherein
the plurality of cameras comprises three or more cameras which are set and disposed so as to be distanced generally equally from each other, and
the distance image generation part generates the distance image based on an average value of distances to the object in the images picked up respectively by two of the cameras disposed adjacent with each other.

11. The vacuum cleaner in accordance with claim 10, wherein
the three or more cameras include two disposed at a relatively narrow interval and two disposed at a relatively wide interval,
the distance image generation part, when the specified set distance is relatively small, generates the distance image based on images picked up by the two of the cameras disposed at the relatively narrow interval, and when the specified set distance is relatively large, generates the distance image based on images picked up by the two of the cameras disposed at the relatively wide interval.

12. The vacuum cleaner in accordance with claim 11, wherein
the three or more cameras are disposed at generally equal intervals,
the distance image generation part, when the specified set distance is relatively large, generates the distance image based on images picked up by two of the cameras disposed adjacent with each other, and when the specified set distance is relatively small, generates the distance image based on images picked up by two of the cameras disposed not adjacent with each other.

13. The vacuum cleaner in accordance with claim 1, wherein the vacuum cleaner further comprises a light source for emitting a light beam of a wavelength to be able to be picked up by the cameras, and
the distance image generation part calculates a distance to a position on the object irradiated with a light emitted by the light source by calculating a distance of the light beam in the image.

14. The vacuum cleaner in accordance with claim 13, wherein
the cameras of the plurality of cameras have set respective image pick up ranges for picking up respective images, the respective image pick up ranges overlapping with each other, and
the light source irradiates the light beam within the image pickup ranges overlapping with each other.

15. The vacuum cleaner in accordance with claim 13, wherein
the light source emits a plurality of light beams.

16. A control method for a vacuum cleaner in which a main casing having a plurality of cameras is enabled to autonomously travel, the plurality of cameras being disposed apart from each other for picking up images on a traveling-direction side,
the method comprising the steps of:
generating a distance image of an object positioned on the traveling-direction side based on images picked up by the plurality of cameras; and
discriminating, when the object in the distance image generated by the distance image generation part is positioned closer than a specified set distance which is previously set, the object is an obstacle; and upon discriminating that the object is an obstacle, the discrimination part sets the specified set distance smaller to re-discriminate whether or not the object is an obstacle by use of the same distance image which was used for the discrimination.

* * * * *